United States Patent [19]
Swanson et al.

[11] Patent Number: 5,798,509
[45] Date of Patent: Aug. 25, 1998

[54] SCANNER WITH DIRECT PIXEL ACCESSING FROM MULTIPLE PIXEL MEMORY ARRAY

[75] Inventors: Paul S. Swanson, Colorado Springs, Colo.; William M. McDonald, Lake Stevens; Kenneth L. Coffman, Mount Vernon, both of Wash.

[73] Assignee: Intermec Corporation, Everett, Wash.

[21] Appl. No.: 581,829

[22] Filed: Jan. 2, 1996

[51] Int. Cl.⁶ .................................................. G06K 7/10
[52] U.S. Cl. ............................................................. 235/462
[58] Field of Search ........................................ 235/462, 454

[56] References Cited

U.S. PATENT DOCUMENTS 5,631,457  5/1997  Fukuda et al. ................... 235/462
5,635,697  6/1997  Shellhammer et al. ............ 235/462

Primary Examiner—F. L. Evans
Attorney, Agent, or Firm—Graham & James LLP

[57] ABSTRACT

Disclosed is apparatus for scanning a field of view for two-dimensional data and for rapidly processing the data. There is a video device viewing the field of view and producing a two-dimensional matrix of pixel data as an output representing a plurality of pixel positions of the field of view. A digital memory receives and holds the two-dimensional matrix of pixel data output from the video device in a plurality of multiple pixel data words. There is also a digital processor including a register for receiving pixel data and logic for processing data to decode it. Primarily, there is pixelizer logic and associated circuitry connected between the digital memory and the digital processor for removing data associated with a specified pixel position within the field of view from an associated one of the plurality of multiple pixel data words in the digital memory and for placing the data into a pre-established bit position within the register of the digital processor. The time required to repeatedly obtain the necessary pixels for processing is thereby greatly reduced and minimized.

10 Claims, 7 Drawing Sheets

FOUR BIT NIBBLE = ONE PIXEL

SIX PIXELS = ONE 32 BIT WORD

| PIXEL NUMBER | 0 | | | | 1 | | | | 2 | | | | 3 | | | |
|---|---|---|---|---|---|---|---|---|---|---|---|---|---|---|---|---|
| PIX | 0 | 1 | 2 | 3 | 4 | 5 | 6 | 7 | 8 | 9 | A | B | C | D | E | F |
| ADDRESS | P0 | P1 | P2 | P3 | P0 | P1 | P2 | P3 | P0 | P1 | P2 | P3 | P0 | P1 | P2 | P3 |

FIG. 15

| PIXEL NUMBER | 0 | | | | | 1 | | | | | 2 | | | | | 3 |
|---|---|---|---|---|---|---|---|---|---|---|---|---|---|---|---|---|
| PIX | 0 | 1 | 2 | 3 | 4 | 5 | 6 | 7 | 8 | 9 | A | B | C | D | E | F |
| ADDRESS | P0 | P1 | P2 | P3 | P4 | P0 | P1 | P2 | P3 | P4 | P0 | P1 | P2 | P3 | P4 | P0 |

FIG. 16

| PIXEL NUMBER | 0 | | | | | | 1 | | | | | | 2 | | | |
|---|---|---|---|---|---|---|---|---|---|---|---|---|---|---|---|---|
| PIX | 0 | 1 | 2 | 3 | 4 | 5 | 6 | 7 | 8 | 9 | A | B | C | D | E | F |
| ADDRESS | P0 | P1 | P2 | P3 | P4 | P5 | P0 | P1 | P2 | P3 | P4 | P5 | P0 | P1 | P2 | P3 |

SCANNER WITH DIRECT PIXEL ACCESSING FROM MULTIPLE PIXEL MEMORY ARRAY

BACKGROUND OF THE INVENTION

1. TECHNICAL FIELD

This invention relates to scanner for scanning barcodes and the like and, more particularly, to apparatus for scanning a field of view for two-dimensional data and for rapidly processing the data comprising, a video device viewing the field of view and producing a two-dimensional matrix of pixel data as an output representing a plurality of pixel positions of the field of view; a digital memory receiving and holding the two-dimensional matrix of pixel data output from the video device in a plurality of multiple pixel data words; a digital processor including a register for receiving pixel data and logic for processing data; and, logic and associated circuitry connected between the digital memory and the digital processor for removing data associated with a specified pixel position within the field of view from an associated one of the plurality of multiple pixel data words in the digital memory and for placing the data into a pre-established bit position within the register of the digital processor.

2. BACKGROUND ART

Scanners for scanning barcodes and the like are well known in the art and are found at various points in everyday life. The barcode 10 of FIG. 1 is a one-dimensional representation of associated data. Typically, such one-dimensional barcodes are scanned by a laser beam which is scanned across the barcode and reflected back to a light sensor so that the light and dark bands of the barcode can be decoded as to the data encoded therein. The scanner can be fixed or hand-held.

In order to get more information into a single barcode, barcodes are moving to a two-dimensional representation. In such case, the scanner 12 must take a video picture 14 of the barcode 10 as depicted in FIG. 2. The video picture 14 is converted into a two-dimensional matrix of pixels 16 as depicted in FIG. 3. As depicted in FIG. 4, the typical prior art scanner system 12 comprises a video input device 17 which views the barcode 10 and produces the video picture 14. The video picture 14 is then stored in a digital memory 18. A processor 20 then removes and analyzes the pixels 16 from the memory 18 in order to determine the data represented. A similar approach is also employed in microelectronic robotics systems and the like. Once all the pixels 16 representing the field of view of the video input device 18 have been stored in memory, the processor 20 (i.e. a digital computer) can analyze the data for any purpose desired.

The problem in barcode readers is data access speed in the processor 20. Users of barcode readers expect to get a valid "read" of the barcode in under one second. Let us say, for example, that the field of view is one inch high by two inches high and that the scanner is similar to that of a facsimile machine, i.e. 200 pixels per inch. Since the pixels in the field of view may be white, black, or various shades of gray as seen by the video input device 18, more than one bit is required to represent each pixel 16. Typically, four bits are employed which allows each pixel 16 to be in sixteen possible gray-level states. At 200 pixels per inch and four bits per pixel, our one inch by two inch field of view thus takes 1,280,000 bits of memory representing 80,000 pixels of information.

Each pixel 16 occupies one nibble 22 having four bits 24 as depicted in FIG. 5. Modern high-speed personal computer chips as would typically be employed as the processor 20 use 32-bit words 26 containing eight pixels 16 as depicted in FIG. 6. The memory 18 comprises individually addressable words 26. Every time the processor 20 wants to use a pixel in its computations, it must go through the process depicted in FIGS. 8 through 10. The word 26 containing the desired pixel 16 is first loaded into a register 28 of the processor 20 as depicted in FIG. 8. Let us assume that the pixel 16 labeled "PIXEL 4" is desired. The register 28 is then shifted right by sixteen bits as depicted in FIG. 9 so as to place PIXEL 4 in the least significant bits of the register. What the four most significant pixel positions of the register 28 now contained is unknown. It depends on the characteristics of the processor 20 and, as will be seen, is unimportant. The register 28 is now combined with a mask register 30 which masks off everything from register 28 except the four least significant bits representing PIXEL 4. The data of PIXEL 4 is finally ready to be used by the processor 20. As can be appreciated, this access time until the pixel data is ready for use is significant —particularly when 80,000 pixels 16 are being repeatedly accessed during the evaluation process. For example, it is estimated that the pixel access portion of the decoding logic is employed some 500,000 times in decoding a typical barcode.

Wherefore, it is an object of this invention to provide a method and apparatus for accessing pixels from multiple pixel computer memory which significantly reduces the access time until the pixel data is ready for use.

It is another object of this invention to provide a method and apparatus for accessing pixels from multiple pixel computer memory in which the pixel is immediately available as the least significant bits of a processor register without any intermediate steps of shifting and masking.

Other objects and benefits of this invention will become apparent from the description which follows hereinafter when read in conjunction with the drawing figures which accompany it.

SUMMARY

The foregoing objects have been achieved by the apparatus of the present invention for scanning a field of view for two-dimensional barcode data and for decoding the barcode data in a minimum time comprising, a video device viewing the field of view and producing a two-dimensional matrix of pixel data as an output representing a plurality of pixel positions of the field of view; a digital memory having a plurality of multiple pixel data words receiving and holding the two-dimensional matrix of pixel data output from the video device in the plurality of multiple pixel data words; a digital processor having a processing register; processing logic for sequentially removing data associated with specified pixel positions within the field of view from associated ones of the plurality of multiple pixel data words in the digital memory, for placing the data into pre-established bit positions of the register of the digital processor, and for using the digital processor to decode data associated with the plurality of pixel positions of the field of view and determine barcode data encoded therein; and, a pixelizer including logic means for inputting a pixel number of a pixel to be obtained, translating the pixel number into a memory address containing the pixel to be obtained, reading contents of the memory address containing the pixel to be obtained, picking the pixel to be obtained from the contents, shifting the pixel to be obtained to the pre-established bit position, and transferring the pixel to be obtained to the register.

DESCRIPTION OF THE DRAWINGS

Figures 8, 9, 10:
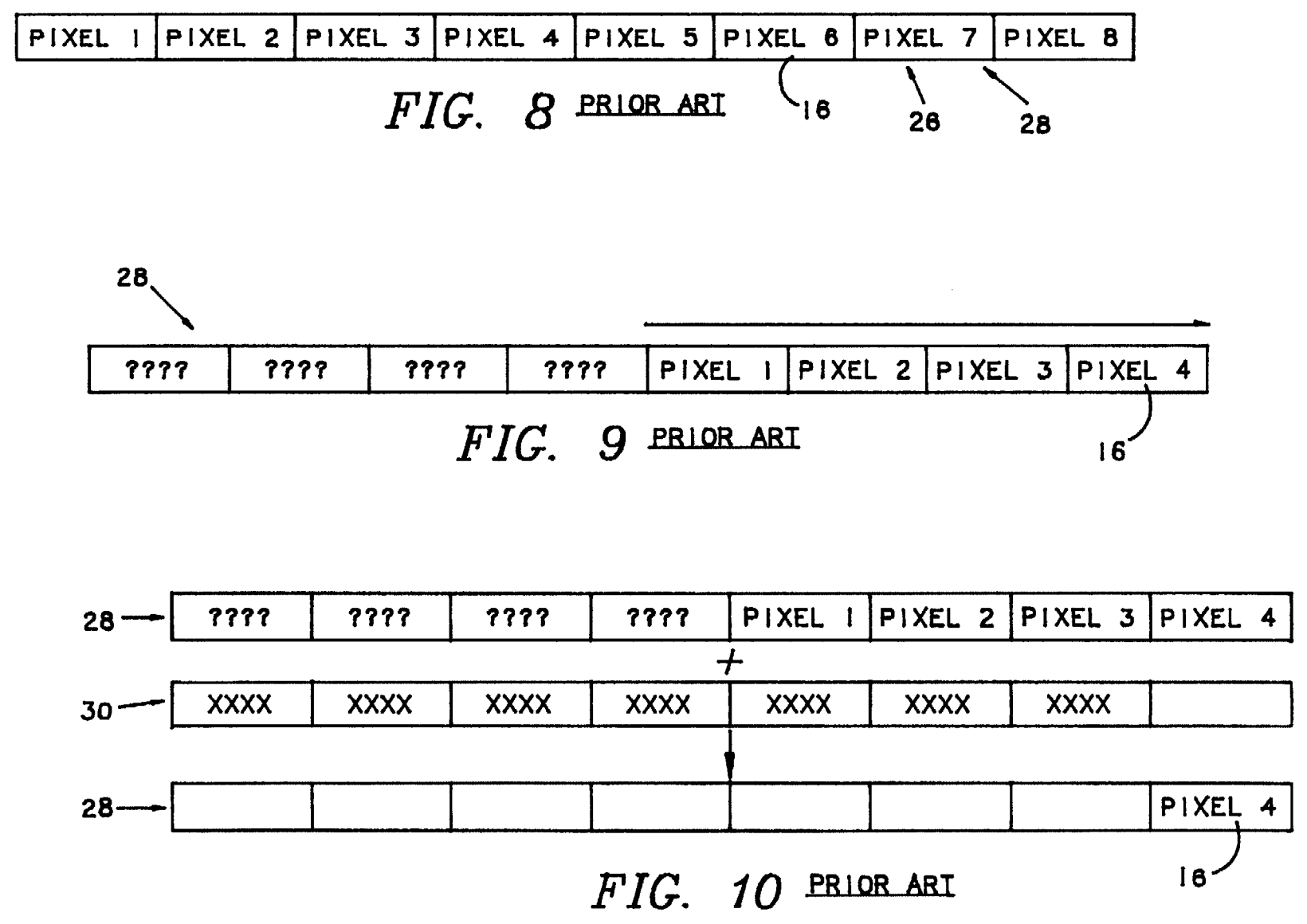

FIG. 8 is a simplified drawing depicting the first step in accessing one pixel from a computer word according to the prior art.

FIG. 9 is a simplified drawing depicting the second step in accessing one pixel from a computer word according to the prior art.

FIG. 10 is a simplified drawing depicting the third step in accessing one pixel from a computer word according to the prior art.

FIGS. 14–16 are examples of the pixel orientation and addressing for 4-bit, 5-bit, and 6-bit pixels, respectively.

DESCRIPTION OF THE PREFERRED EMBODIMENT

Figure 2:
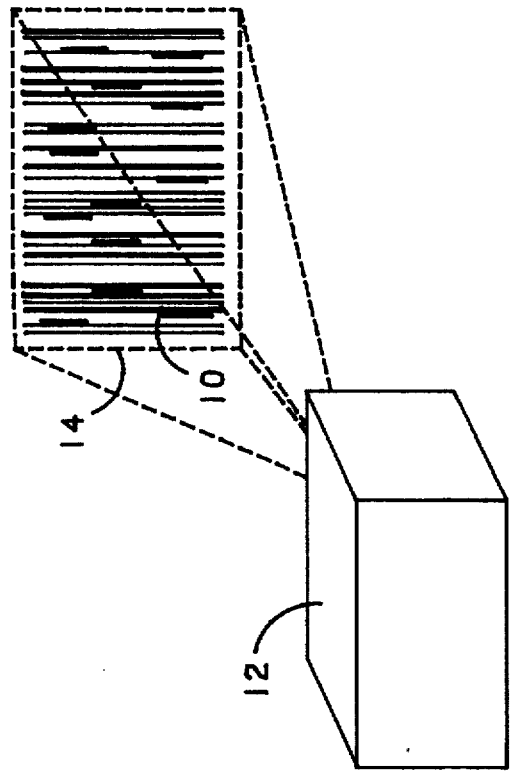
FIG. 2 is a simplified drawing of a scanning system for barcodes in which the barcodes are scanned by video techniques.
Figure 4:
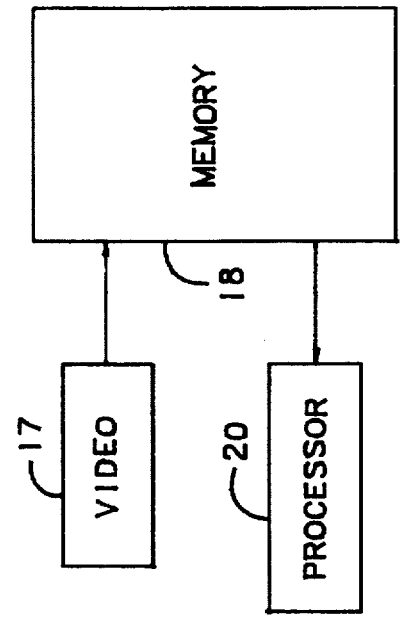
FIG. 4 is a simplified functional block diagram of the system of FIG. 2.
Figure 1:
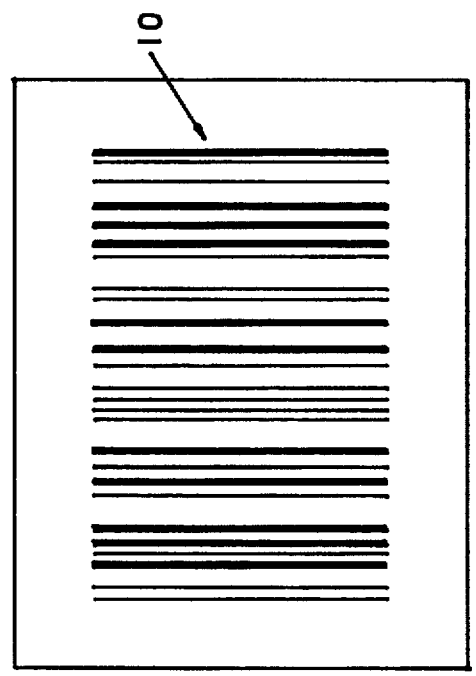
FIG. 1 is a simplified enlarged drawing of a prior art barcode.
Figure 3:
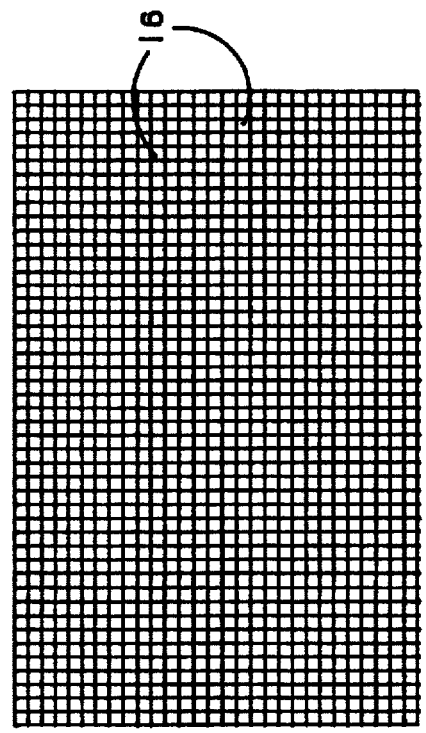
FIG. 3 is a simplified drawing of a pixel layout as employed in the system of FIG. 2.
Figure 5:
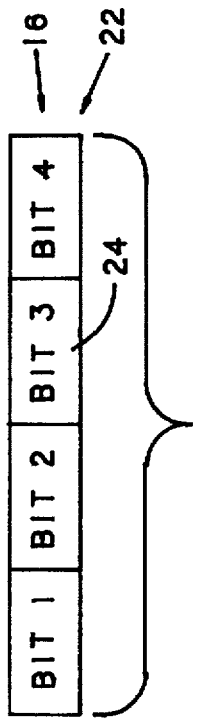
FIG. 5 is a simplified drawing of a four bit nibble representing sixteen possible gray levels of the pixel.
Figure 6:
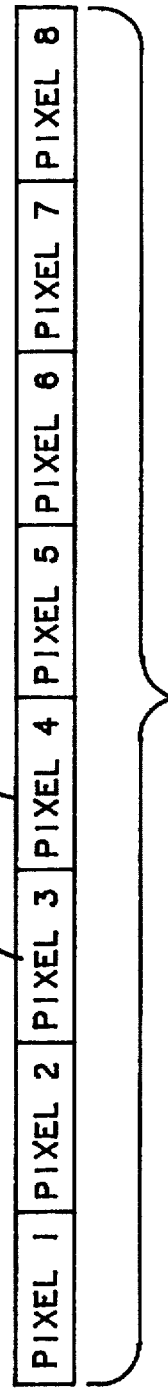
FIG. 6 is a simplified drawing of one thirty-two bit computer word containing eight nibbles or pixels.
Figure 7:
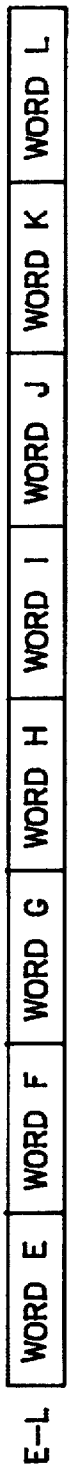
FIG. 7 is a simplified drawing of a computer memory containing pixel information stored in words.
Figure 11:
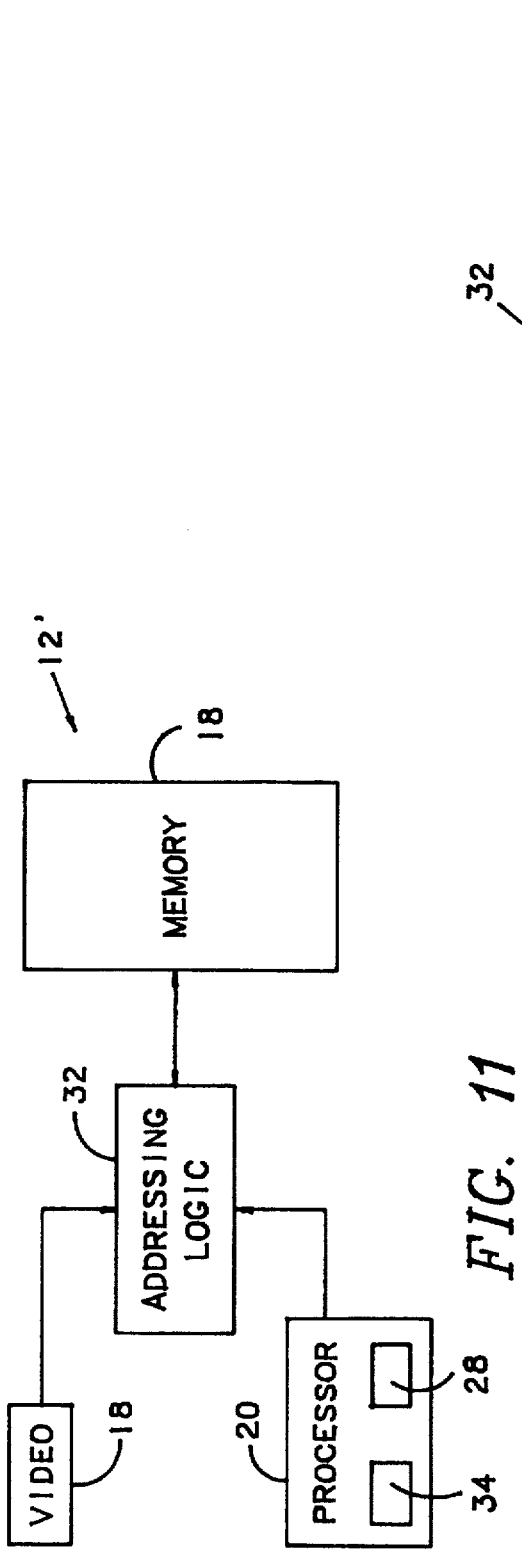
FIG. 11 is a simplified functional block diagram of a scanning system according to the present invention in a preferred embodiment.

A video scanner system according to the present invention is shown in simplified functional block diagram form in FIG. 11 where it is generally indicated as 12'. As with the prior art system 12 of FIG. 4, there is a video input device 18 which views the barcode 10 and produces the video picture 14 which is then stored in the digital memory 18. There is also a processor 20 containing logic 34 for processing data with the processor 20 to decode barcodes encoded therein and a register 28 for receiving pixel data to be processed. The difference is in the addressing logic 32 which is interposed between the memory 18 and the video input device 18 and processor 20.

Figure 12:
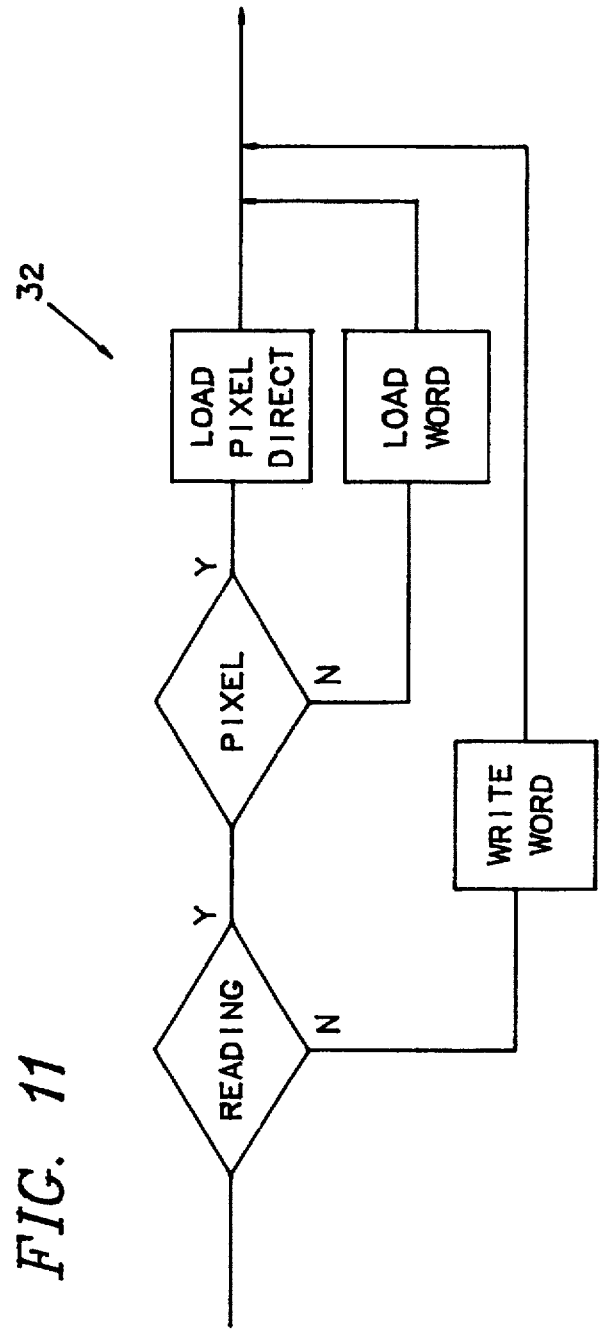
FIG. 12 is a logic diagram of logic that can be employed in the addressing logic of the system of FIG. 11.

Exemplary logic for the addressing logic 32 according to the present invention is depicted in the logic flowchart of FIG. 12. If data are being written to the memory 18, it is done on a word basis. If data are being read, the logic 32 asks whether it is to be read in the pixel mode or word mode. If in the word mode, the entire word as addressed is loaded in the conventional manner. If in the pixel mode, however, the designated pixel 16 is loaded directly into the most significant bits of the loading register of the processor 20.

Figure 13:
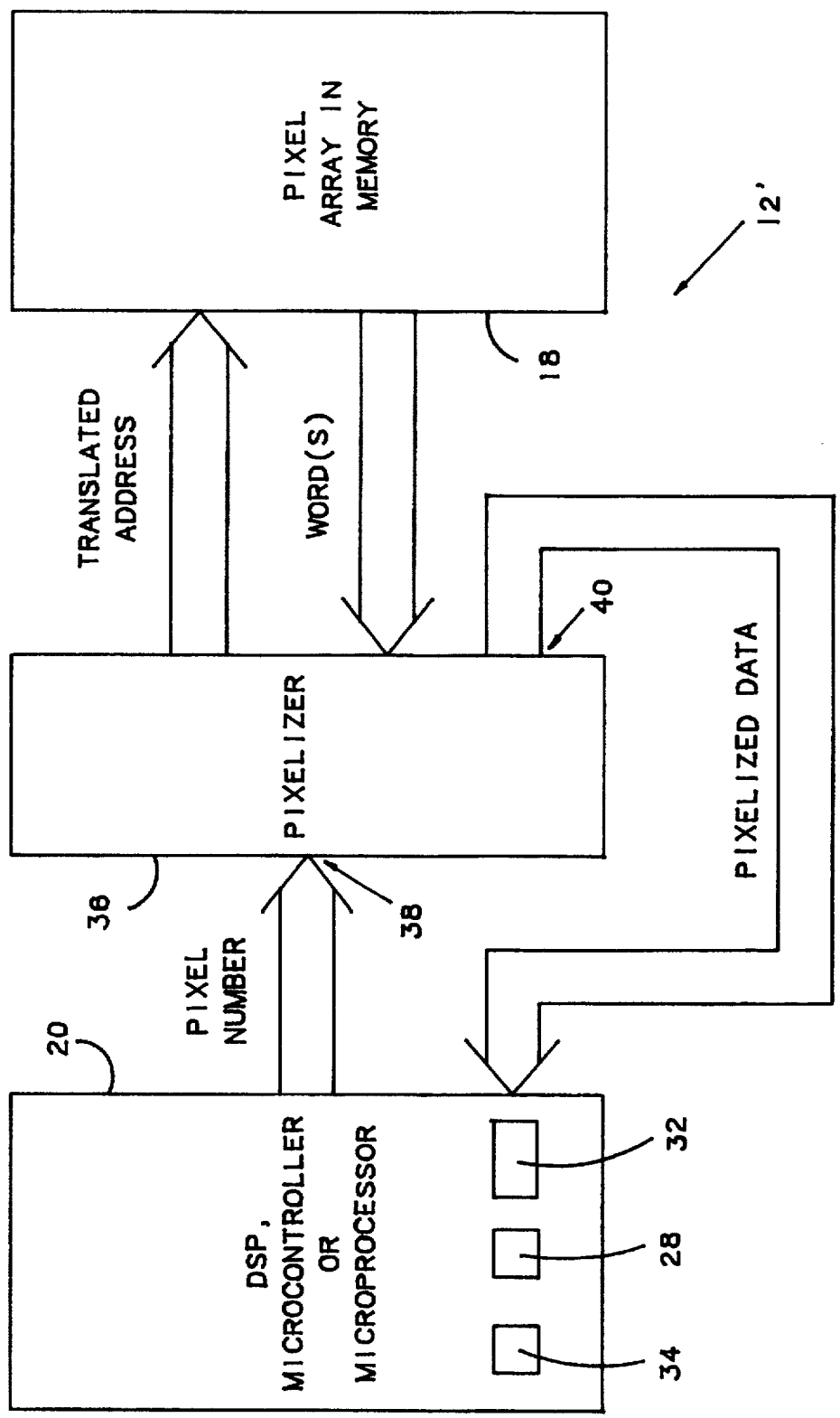
FIG. 13 is a more detailed functional block diagram of the scanning system of FIG. 11 and showing the pixelizer employed therein.

The direct loading of the designated pixel 16 is accomplished by the pixelizer 36 of FIG. 13. The pixel number is input to the pixelizer 36 which in a minimum of access times translates the pixel number into an address in the memory 18, inputs the word or words from the memory 18 containing the requested pixel, masks off the pixel, and delivers it to the register 28 left-justified through output 40— thereby attaining the desired object of reducing access time to obtain pixels for processing. FIGS. 14–16 show examples of the pixel orientation and addressing for 4-bit, 5-bit, and 6-bit pixels, respectively. As mentioned earlier, the expected commercial embodiment of the present invention will be directed to a 4-bit pixel arrangement in 32-bit words so that any pixel addressed will always be totally contained in one computer word as depicted in FIG. 14. Other arrangements as shown in FIGS. 15 and 16 would, of course, require that two consecutive computer words be input in those cases where a pixel overlapped two words.

Figure 17:
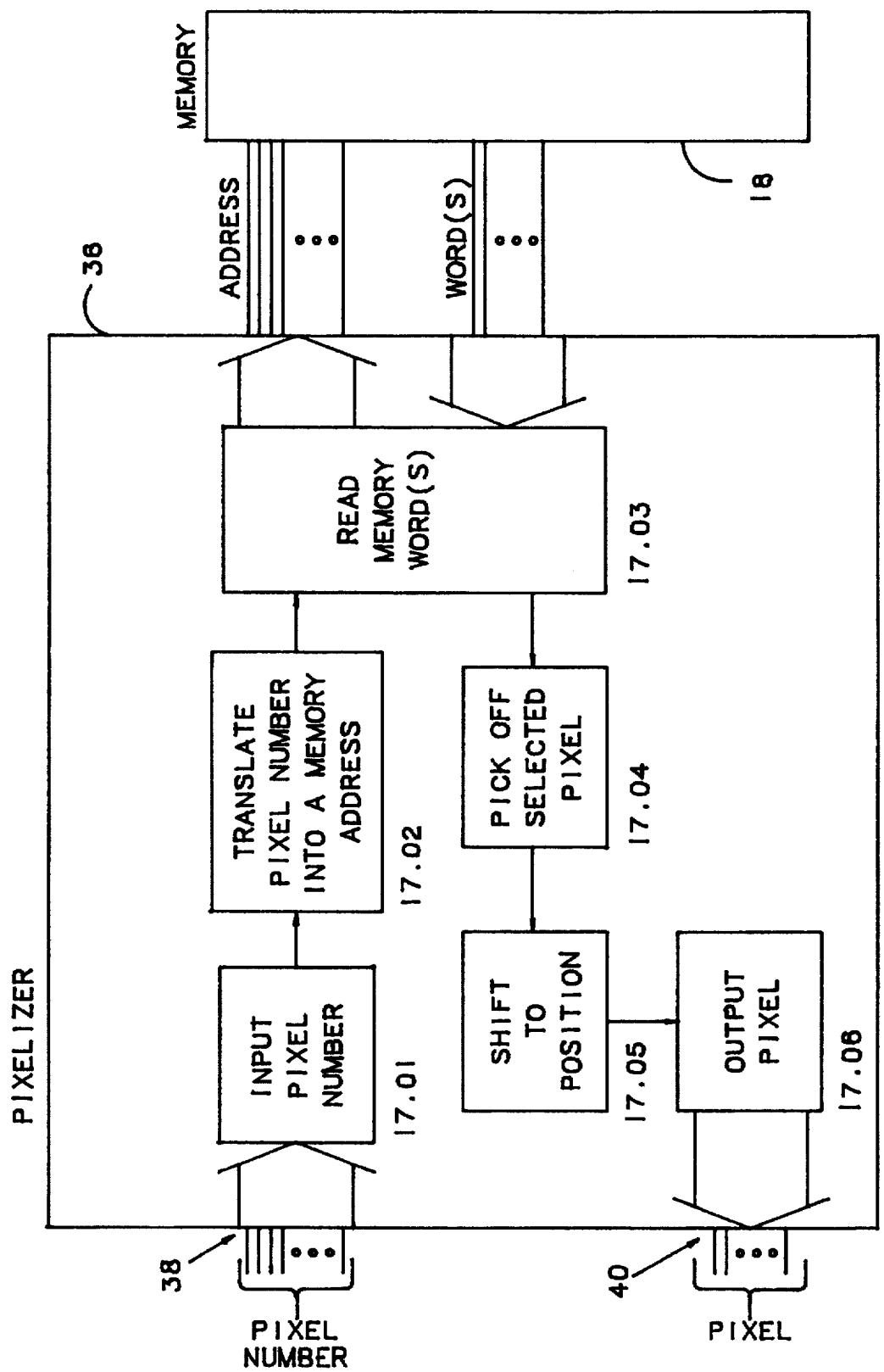
FIG. 17 is a detailed functional block diagram of the pixelizer of the present invention.

The pixelizer 36 as constructed for a tested embodiment is shown in greater detail in FIG. 17. The pixel number as a sixteen bit number between 0000 (hexadecimal) and FFFF is input to the pixelizer 36 at input 38 by block 17.01. The pixelizer 36 translates the pixel number into an address within the memory 18 at block 17.02. Block 17.03 then uses that address to access the memory 18 and read the memory word or sequential words containing the desired pixel. At block 17.04, the logic of the pixelizer 36 picks off the selected pixel from the word or words read from the memory 18. Thereafter, the pixel is shifted at block 17.05 to a known position. In the tested embodiment, it is left-justified. It could also be right-justified or placed in any known bit position. At block 17.06, the pixel is output at 40 ready to be analyzed.

In the early implementation of logic, it was done with discrete components, i.e. gates, transistors, etc., and circuit diagrams could be shown therefor for purposes of teaching under 35 U.S.C. §112 and disclosing the best mode contemplated. In the early implementation of logic as integrated circuits, circuit diagrams still existed despite the fact that the implementation was in silicon through the use of masked layers. In the implementation of logic by way of integrated circuits in contemporary manufacturing techniques, circuit diagrams and masks no longer exist or are required. Just as with computer programs where the machine language which runs in the computer is generated by the compilation of high-level statements, integrated circuits are generated directly in the silicon (or other appropriate material) from the compilation and processing of high-level statements. This process is well understood by those of ordinary skill in the art. Accordingly, such ordinary technicians could take the functional block diagram of FIG. 17 and use high-level statements to generate an integrated circuit which would perform the functions of the pixelizer 36 as described hereinbefore. "For the purposes of a complete disclosure of the preferred embodiment and best mode for the pixelizer 36 in a teaching sufficient to teach one of ordinary skill in the art how to duplicate the tested embodiment of the present invention, the high-level statements employed in the generation of that tested embodiment are attached to this specification as Appendix A."

Wherefore, having thus described the present invention, what is claimed is:

1. Apparatus for scanning a field of view for two-dimensional data and for rapidly processing the data comprising:

a) a video device viewing the field of view and producing a two-dimensional matrix of pixel data as an output representing a plurality of pixel positions of the field of view;

b) a digital memory receiving and holding said two-dimensional matrix of pixel data output from said video device in a plurality of multiple pixel data words;

c) a digital processor including a register for receiving pixel data and logic for processing data; and, d) logic and associated circuitry connected between said digital memory and said digital processor for removing data associated with a specified pixel position within the field of view from an associated one of said plurality of multiple pixel data words in said digital memory and for placing said data into a pre-established bit position within said register of said digital processor.

2. The apparatus for scanning a field of view for two-dimensional data and for rapidly processing the data of claim 1 and additionally comprising:

additional logic within said logic and associated circuitry for selectively alternatively reading whole ones of said multiple pixel data words from said digital memory into said register of said digital processor.

3. The apparatus for scanning a field of view for two-dimensional data and for rapidly processing the data of claim 1 wherein said logic and associated circuitry comprises:

a) logic for inputting a pixel number of a pixel to be obtained;
b) logic for translating said pixel number into a memory address containing said pixel to be obtained;
c) logic for reading contents of said memory address containing said pixel to be obtained;
d) logic for picking said pixel to be obtained from said contents;
e) logic for shifting said pixel to be obtained to said pre-established bit position; and,
f) logic for outputting said pixel to be obtained.

4. A method for scanning a field of view for two-dimensional data and for rapidly processing the data comprising the steps of:

a) viewing the field of view with a video device and producing a two-dimensional matrix of pixel data as an output representing a plurality of pixel positions of the field of view;
b) receiving and holding the two-dimensional matrix of pixel data output from the video device in a plurality of multiple pixel data words of a digital memory;
c) sequentially removing data associated with specified pixel positions within the field of view from associated ones of the plurality of multiple pixel data words in the digital memory and placing the data into pre-established bit positions of a register of a digital processor; and,
d) sequentially processing the data in the register with the digital processor as soon as the data is available in the register.

5. The method of claim 4 and additionally comprising the step of:

selectively alternatively reading whole ones of the multiple pixel data words from the digital memory into the register of the digital processor.

6. The method of claim 4 wherein said step of sequentially removing data associated with specified pixel positions within the field of view from associated ones of the plurality of multiple pixel data words in the digital memory and placing the data into pre-established bit positions of a register of a digital processor comprises the steps of:

a) inputting a pixel number of a pixel to be obtained;
b) translating the pixel number into a memory address containing the pixel to be obtained;
c) reading contents of the memory address containing the pixel to be obtained;
d) picking the pixel to be obtained from the contents;
e) shifting the pixel to be obtained to the pre-established bit position; and,
f) outputting the pixel to be obtained.

7. A method for scanning a field of view for two-dimensional barcode data and for rapidly processing the barcode data comprising the steps of:

a) viewing the field of view with a video device and producing a two-dimensional matrix of pixel data as an output representing a plurality of pixel positions of the field of view;
b) receiving and holding the two-dimensional matrix of pixel data output from the video device in a plurality of multiple pixel data words of a digital memory;
c) sequentially removing data associated with specified pixel positions within the field of view from associated ones of the plurality of multiple pixel data words in the digital memory and placing the data into pre-established bit positions of a register of a digital processor by,
  c1) inputting a pixel number of a pixel to be obtained,
  c2) translating the pixel number into a memory address containing the pixel to be obtained,
  c3) reading contents of the memory address containing the pixel to be obtained,
  c4) picking the pixel to be obtained from the contents,
  c5) shifting the pixel to be obtained to the pre-established bit position, and
  c6) transferring the pixel to be obtained to the register; and,
d) sequentially processing the data in the register with the digital processor as soon as the data is available in the register.

8. The method of claim 7 and additionally comprising the step of:

selectively alternatively reading whole ones of the multiple pixel data words from the digital memory into the register of the digital processor.

9. Apparatus for scanning a field of view for two-dimensional barcode data and for decoding the barcode data in a minimum time comprising:

a) a video device viewing the field of view and producing a two-dimensional matrix of pixel data as an output representing a plurality of pixel positions of the field of view;
b) a digital memory having a plurality of multiple pixel data words receiving and holding said two-dimensional matrix of pixel data output from said video device in said plurality of multiple pixel data words;
c) a digital processor having a processing register;
d) processing logic for sequentially removing data associated with specified pixel positions within the field of view from associated ones of said plurality of multiple pixel data words in the digital memory, for placing the data into pre-established bit positions of said register of said digital processor, and for using said digital processor to decode data associated with said plurality of pixel positions of the field of view and determine barcode data encoded therein; and,
e) a pixelizer including logic means for inputting a pixel number of a pixel to be obtained, translating said pixel number into a memory address containing said pixel to be obtained, reading contents of said memory address containing said pixel to be obtained, picking said pixel to be obtained from said contents, shifting said pixel to be obtained to said pre-established bit position, and transferring said pixel to be obtained to said register.

10. An integrated circuit pixelizer for sequentially removing data associated with specified pixel positions within a field of view from associated ones of a plurality of multiple pixel data words in a digital memory and placing the data into pre-established bit positions of a register of a digital processor comprising:

a) first logic means for inputting a pixel number of a pixel to be obtained;

b) second logic means for translating the pixel number into a memory address containing the pixel to be obtained;

c) third logic means for reading contents of the memory address containing the pixel to be obtained;

d) fourth logic means for picking the pixel to be obtained from the contents;

e) fifth logic means for shifting the pixel to be obtained to the pre-established bit position; and, f) sixth logic means for transferring the pixel to be obtained to the register.

* * * * *